(12) United States Patent
Jennings et al.

(10) Patent No.: US 6,317,535 B1
(45) Date of Patent: Nov. 13, 2001

(54) SYSTEM AND METHOD FOR TESTING OPTICAL FIBERS THAT LEAD BETWEEN A TELECOMMUNICATIONS PROVIDER AND A CUSTOMER'S PREMISES

(75) Inventors: Mark Richard Jennings, Andover; Frank Salvatore Leone, Berkeley Heights; Richard Joseph Pimpinella, Hampton, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/379,858

(22) Filed: Aug. 24, 1999

(51) Int. Cl.⁷ ........................................................ G02B 6/28
(52) U.S. Cl. .............................................. 385/24; 359/125
(58) Field of Search ............................. 385/24, 100, 134, 385/137; 356/73.1; 359/124–127, 173

(56) References Cited

U.S. PATENT DOCUMENTS

| | | | |
|---|---|---|---|
| 4,911,515 | * | 3/1990 | So et al. ................................. 359/173 |
| 5,077,729 | * | 12/1991 | Wong .................................... 359/110 |
| 5,510,917 | * | 4/1996 | Corke et al. .......................... 359/110 |
| 5,995,687 | * | 11/1999 | White ..................................... 385/14 |
| 6,011,623 | * | 1/2000 | MacDonald et al. ................ 356/352 |
| 6,088,497 | * | 7/2000 | Phillips et al. .......................... 385/48 |

* cited by examiner

Primary Examiner—Rodney Bovernick
Assistant Examiner—Michelle R. Connelly-Cushwa
(74) Attorney, Agent, or Firm—Gibbons, Del Deo, Dolan, Griffinger & Vecchione

(57) ABSTRACT

A system and method for testing the integrity of a pair of optical fibers that are received by a specific customer facility through the optical fiber network of a telecommunications provider. In one embodiment, the system contains a monitor and test access module including a wavelength division multiplexer for each pair of optical fibers that lead to a customer facility and an optical tap and monitoring circuit for monitoring the optical signal transmitted from the customer facility. Monitoring of the optical signal generated from the customer location gives an indication of the general quality of the fiber optic connection. A remote fiber test system that includes an optical time domain reflectometer can be coupled through the monitor and test access module. The optical fibers can be tested one at a time, or the two optical fibers leading to the same customer facility can be looped together and tested at the same time. Alternately, an optical test signal source for producing said optical test signal and an optical signal monitor for detecting the optical test signal can be routed through the monitor and test access module.

12 Claims, 4 Drawing Sheets

SYSTEM AND METHOD FOR TESTING OPTICAL FIBERS THAT LEAD BETWEEN A TELECOMMUNICATIONS PROVIDER AND A CUSTOMER'S PREMISES

RELATED APPLICATIONS

This application is related to U.S. Pat. No. 5,793,909 entitled Monitor and Test Access Module and to the following co-pending U.S. patent applications:

U.S. patent application Ser. No. 09/430,548, entitled OPTICAL TRANSMITTER MODULE FOR A FIBER OPTIC LOOP BACK MONITORING SYSTEM, (Jennings 9-16-36) filed Oct. 29, 1999.

U.S. patent application Ser. No. 09/430,640, entitled, MONITOR MODUILE FOR A FIBER OPTIC LOOP BACK MONITORING SYSTEM, (Jennings 10-17-37) filed Oct. 29, 1999, each of the above disclosures being incorporated herein by reference.

BACKGROUND OF THE INVENTION

1. Field of the Invention

The present invention relates to systems and methods that are used to monitor and test the integrity of optical fibers between points. More particularly, the present invention relates to systems and methods of monitoring a set pair of optical fibers that lead to specific customer facility from the central office of a telecommunications provider.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, equipment is used at the central office to organize various optical fibers in the optical fiber network. In certain optical networks, the optical fibers at the central office are connected to dedicated pieces of equipment, such as optical signal transmitters, that serve only one purpose. If the optical fibers are to be connected to another piece of equipment, such as test equipment, the optical fibers must be manually connected to that new piece of equipment.

In more versatile applications, optical fibers are terminated at fiber administration systems at the central office. Fiber administration systems enable many different types of equipment to be connected to the optical fibers without having to reroute the optical fibers from their point of termination.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein.

Each optical distribution frame located at the central office typically defines a plurality of bays, wherein each bay houses several different types of dedicated equipment shelves, such as fiber distribution shelves. On each of the fiber distribution shelves are optical connection ports that receive the ends of all of the individual optical fibers that enter the central office and are contained within the optical fiber network. By terminating each optical fiber at an optical connection port on one of the different fiber distribution shelves, the location of each optical fiber becomes known within the overall assembly. Once terminated at a known address on one of the fiber distribution shelves, each optical fiber can be selectively coupled to equipment on other shelves of the fiber administration system or other optical equipment located at the central office. As a result, the optical signals sent along each optical fiber can be selectively controlled.

At the opposite end of the various optical fibers are the customers of the telecommunications provider. With customers that have smaller scale telecommunications needs, the optical signals transmitted on the optical fiber network are converted to electrical signals, prior to the customer's premises in a traditional manner. As such, the entire optical network is controlled and maintained by the telecommunications provider. However, is with customers that have large scale telecommunication requirements, it is not uncommon for the telecommunications provider to run a pair of optical fibers from the optical network directly into the customer premises. One of the optical fibers transmits signals from the telecommunications provider to the customer and the other optical fiber transmits signals from the customer to the telecommunications provider.

With customers that receive optical fiber pairs from their telecommunications provider, all incoming and outgoing transmissions are directed through these optical fibers. Accordingly, to disconnect either of these optical fibers is to completely disrupt the telecommunications service to that customer.

When a customer reports trouble with a telecommunications transmission, the problem can be either related to the optical fibers owned by the telecommunications provider or the telecommunications equipment owned by the customer. Since the optical fiber leading to the customer premises cannot be disconnected, it is difficult to pinpoint whether a problem is contained in the telecommunication provider's equipment or the customer's equipment. The result is that a technician from the telecommunications provider must be dispatched to the customer's premises and time consuming manual tests must be conducted to locate the exact point of the problem.

A need therefore exists for a system and method, whereby the integrity of an optical fiber pair leading to specific customer premises can be monitored and tested in a remote, automated procedure.

SUMMARY OF THE INVENTION

A system and method for testing the integrity of a pair of optical fibers that are received by a specific customer facility through the optical fiber network of a telecommunications provider. By being able to remotely test the integrity of the fiber optic lines provided by the telecommunications provider, costly and unnecessary service calls can be eliminated to the customer location.

In one embodiment, the system contains a monitor and test access module for monitoring the optical signal transmitted from the customer facility. The monitor and test access module includes a wavelength division multiplexer for each pair of optical fibers that lead to a customer facility and an optical tap and monitoring circuit. Monitoring of the optical signal generated from the customer location gives an indication of the general quality of the fiber optic connection.

A remote fiber test system is provided that includes an optical time domain reflectometer. The optical time domain reflectometer is selectively coupled to a selected wavelength division multiplexer in the monitor and test access module by an optical switch. Once connected by the optical switch, the optical time domain reflectometer tests the optical fibers that are coupled to that wavelength division multiplexer. The optical fibers can be tested one at a time, or the two optical fibers leading to the same customer facility can be looped together and tested at the same time. Alternately, an optical test signal source for producing said optical test signal and an optical signal monitor for detecting the optical test signal can be routed through the wave division multiplexers of the monitor and test access module.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
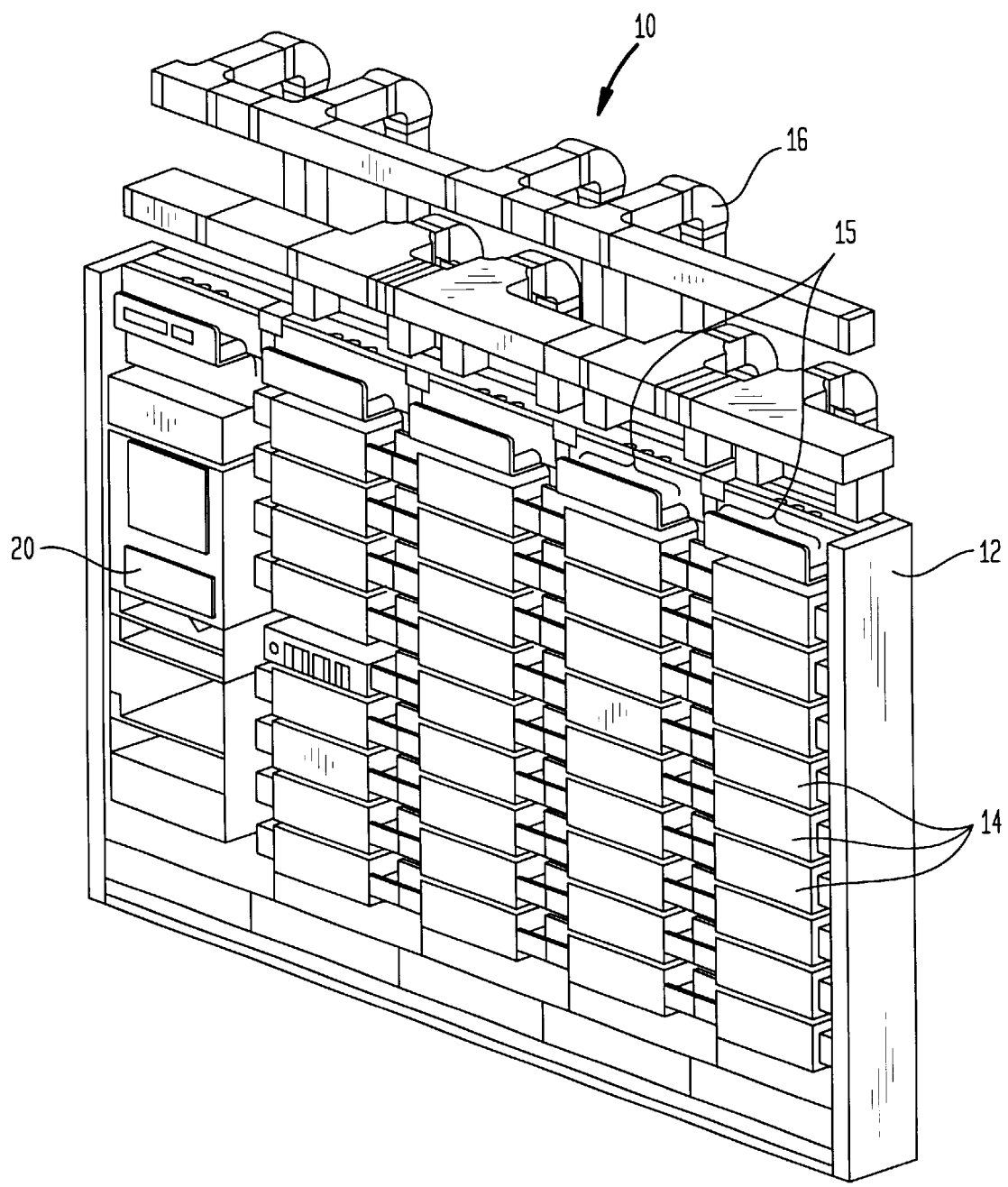
FIG. 1 is perspective view of an optical fiber administration system containing a first plurality of bays and a second plurality of various types of shelves in each bay.

In FIG. 1, an exemplary fiber administration system is shown. The fiber administration system 10 includes a fiber distribution frame 12 that is affixed in a set position to the floor of a central office. The fiber distribution frame 12 defines a plurality of bays 15. Each bay 15 is a vertical structure that supports a plurality of shelves 14. The shelves 14 come in one of three standard sizes, having a five inch height, a seven inch height or a nine inch height. The shelves 14 retain various optical components used in the administration of optical fibers.

A network of conduits 16 leads the various optical fibers (not shown) from the optical fiber network to the shelves 14. Included within the various optical fibers are the optical fibers of an optical fiber cable that is to be tested.

In addition to the various shelves 14 in the fiber administration system 10, the fiber administration system also includes a systems controller 20. The systems controller 20 runs the software that controls the fiber administration system 10. The fiber administration system may also contain an optical switch and optical testing equipment, such as an optical time domain reflectometer. If the fiber administration system itself does not contain an appropriate optical switch or optical testing equipment, such devices can be separately brought to the fiber administration system 10 and interconnected to the fiber administration system 10.

In addition to the test equipment mentioned above, the fiber administration system may also contain various operation specific test and monitoring modules, which couple to the fiber administration system for carrying out the methodology of the present invention. One such module is a monitor and test access (MTA) module 30, shown in FIG. 2. The MTA module 30 provides a combination of monitoring and test access for two fiber lines, typically a transmit/receive pair. Test access is provided at the MTA module to both the transmit and receive fiber via first and second switch ports 36,38. As shown, the first and second switch ports can be coupled to a remote test unit (RTU) 40 via an optical switch 42.

The MTA module includes two wave division multiplexers (WDMs) 32, 34, one of which couples to an optical tap 44 included in the MTA module. The tap, for example, a 20 dB tap, taps off 0.1 dB of the optical receive signal generated from the customer equipment. In an optical monitoring circuit 46 of the of the MTA module, the optical signal is converted to a corresponding electrical signal. The MTA module 30 includes electronics, such as a microcontroller which interprets the electrical signal to give an indication, for example, of signal strength and quality of signal on the fiber optic line. The specific functionality of the MTA module is described in greater detail in U.S. Pat. No. 5,793,909 entitled Optical Monitoring and Test access Module, which has already been incorporated herein by reference.

Figure 2:
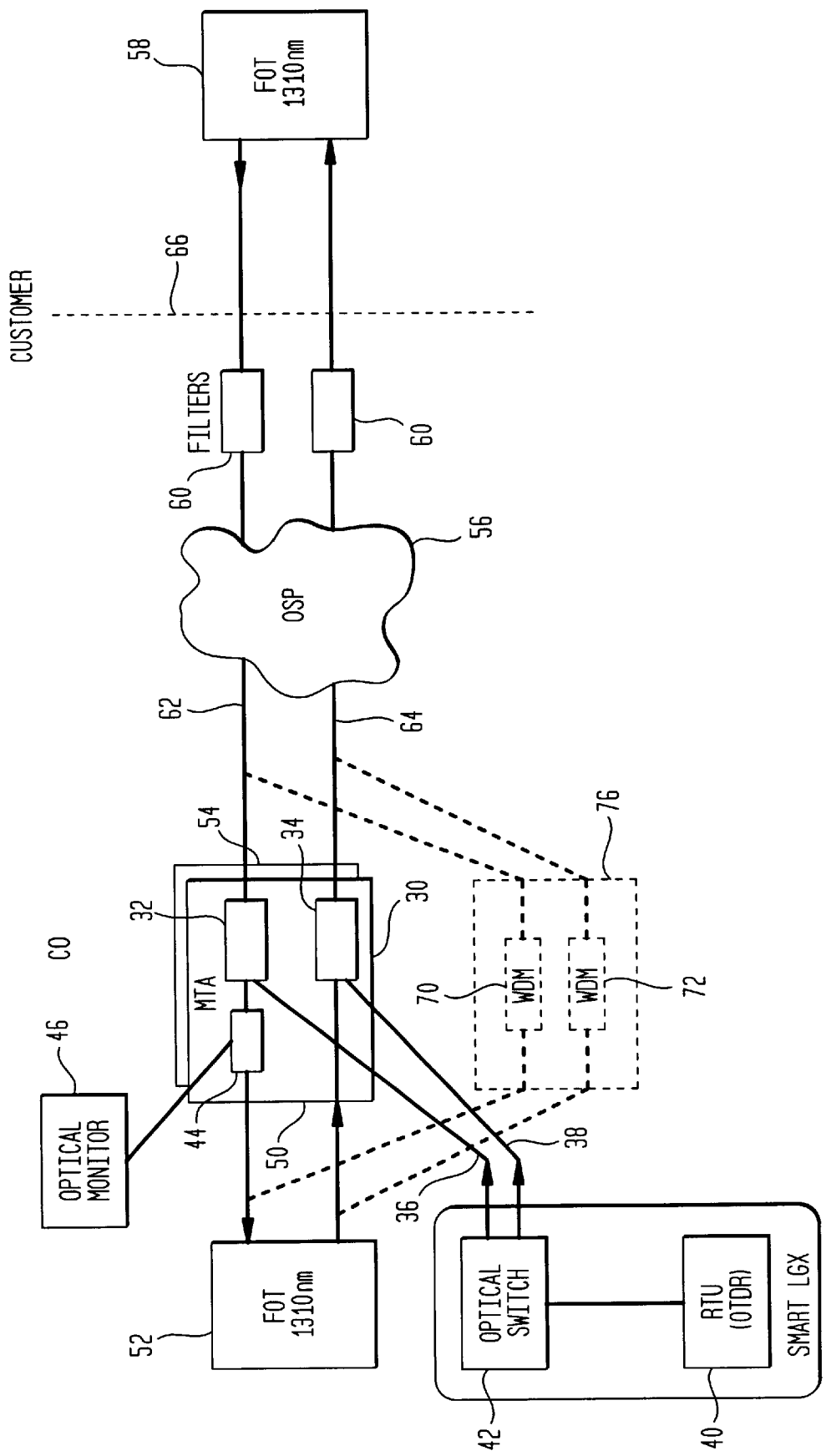
FIG. 2 is a schematic view of a first embodiment of the present invention system, illustrating its method of operation.

As shown in FIG. 2, the MTA module 30 is located at the central office. The fiber optic pair terminating on the central office side 50 of the MTA module couples to fiber optic transmission equipment 52 located at the central office of the telecommunications provider. On the customer side 54 of the MTA module, the fiber optic pair proceeds through the outside plant environment 56 and couples to fiber optic transmission equipment 58 at the customer location. As shown in FIG. 2, optical filters 60 are coupled to both the transmit and receive fibers 62, 64 at the customer premises just prior to the demarcation line 66. The demarcation line 66 represents a point at the customer's premises at which responsibility for upkeep of the fiber optic system changes between that of the customer and the telecommunications provider.

Thus, in accordance with the present invention, the basic elements necessary for monitoring and testing optical fibers leading between a telecommunications provider and a customer's premises include an MTA module, two switch ports 36, 38 and two optical filters 60. In describing the operation of the present invention, it can be seen that the communications signal generated between the fiber optic transmission equipment 52,58 at the central office and the customer's premises pass through the MTA module 30. As discussed, the MTA module includes, for example, a 20 dB2 tap which taps off 0.1 dB of the optical receive signal generated from the customer equipment. By processing the optical signal received at the optical tap of the MTA module, the electronics in the MTA module are able to monitor and test the general condition of the specific fiber optic line by using the transmission signal generated from the customer's premises. Should the optical monitoring of the customer transmission signal indicate a problem, for example, by falling below a given threshold, then the fiber optic cable leading to the customer's premises can be tested by way of a test signal launched from the OTDR through one or both of the fibers. In this way, a determination can be made as to whether the source of the problem lies within the fiber optic cable provided by the telecommunications provider. If such is not the case, costly and unnecessary service calls can be eliminated.

The optical filters 60 are placed at the customer location in order to filter the test signal from the OTDR from hitting and interrupting the fiber optic transmission equipment 58 at the customer's premises. As would be understood, the launching of the test signal in response to an indication from the optical monitoring circuit of the MTA module can be accomplished automatically (as when the system is part of larger fiber administration system) or manually (when the modules and test equipment are acting in more of a stand alone fashion).

In an alternate and more basic embodiment of the present invention, two wave division multiplexers (WDMs) 70, 72, shown in dotted lines in FIG. 2, can be substituted for the MTA module. The WDMs 70, 72 couple to the optical switch 42 in a similar fashion to that of the WDMs 32, 34 included in the MTA module 30. The WDMs could take the form of WDM module 76 manufactured by Lucent Technologies which includes two VVDMs packaged with corresponding switch ports for ease of connection with both the transmit and receive optical fiber paths 62, 64. In this case, the customer's transmission signal is no longer monitored. Accordingly, test signals from the RTU 40 or OTDR are only generated in response to a complaint from the customer regarding its telecommunications service.

Figure 3:
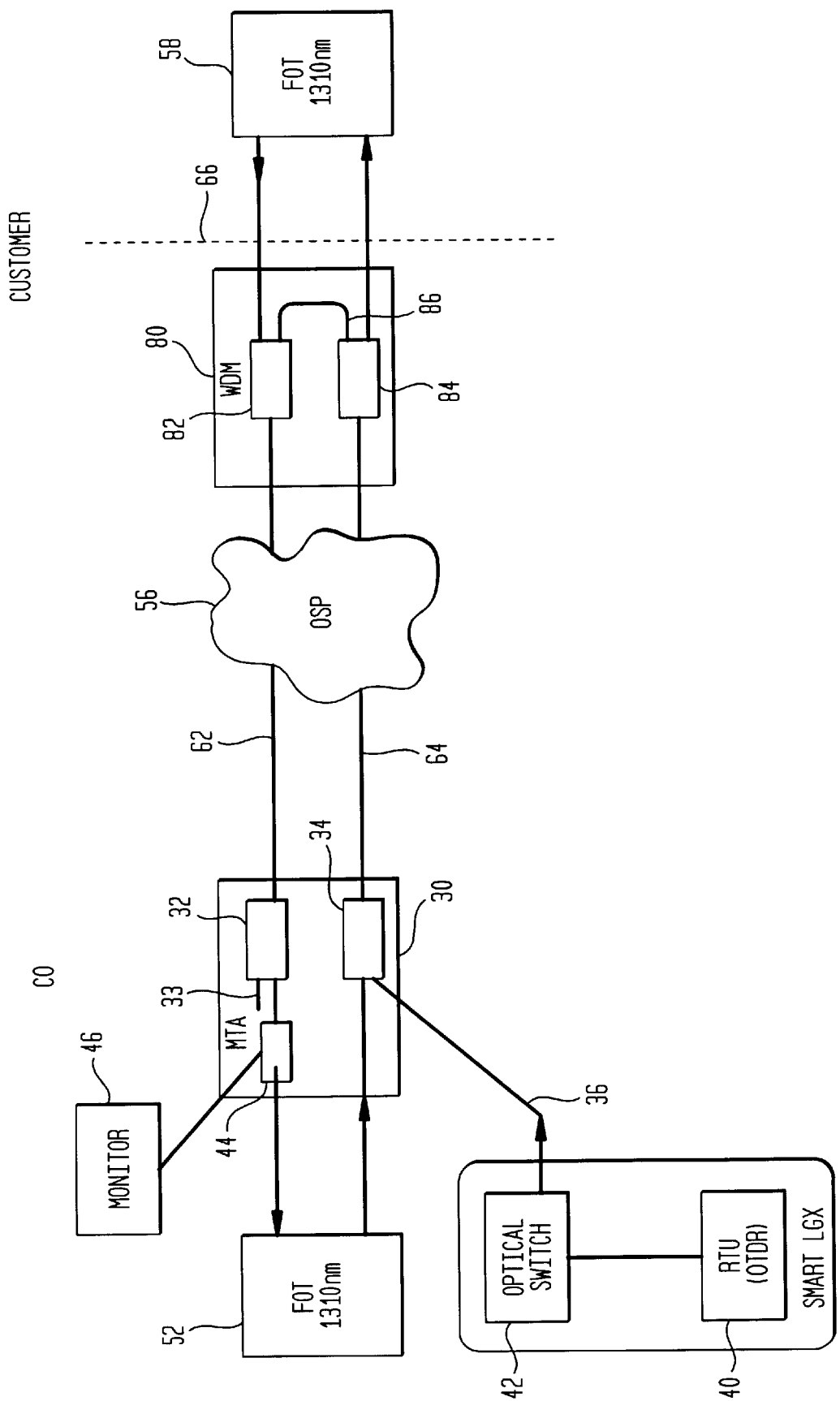
FIG. 3 is a schematic view of a second embodiment of the present invention system, illustrating its method of operation.

Referring to FIG. 3, an alternate embodiment of the testing methodology of the present invention is shown, where like components from FIG. 2 are referred to using like reference numerals. The monitor and test methodology shown in FIG. 3 is similar to that of FIG. 2 in that the transmission fiber 62 from the customer's premises is monitored by the MTA module using the customer's transmission signal which is stripped of by the optical tap 44. A single WDM module 80 is also placed at the customer's premise prior to the demarcation point 66. An optical loop 86 is put in place between a first WDM 82 and a second WDM 84 of the WDM module. The test signal generated from the RTU 40 on the customer's receive fiber path 64 is looped back toward the MTA module on the transmit fiber 62. In this way the RTU 40 can provide surveillance of the entire fiber path while utilizing only a single switch port 36.

Since switch ports are many times at a premium within a fiber optic administration system, utilization by the present methodology of only one switch port provides a significant savings in resources. As would be understood, the embodiment shown in FIG. 3 is also advantageous in that the test signal generated by the RTU 40 is stopped at point 33 by the WDM 32 of the MTA module 30 which receives the customer's transmission signal. Accordingly, the test signal does not reach the optical tap and does not distort the transmission signal generated from the customer's premises.

The methodology described with respect to FIG. 3 is advantageous in that it allows for the savings of a single switch port over the methodology described with respect to FIG. 2. A disadvantage over FIG. 2, however, is that the customer must provide for additional telecommunications equipment at the customer site. This would include the two WDMs 82, 84 which act in the same manner as the filters of FIG. 2. This provision of the optical filters as shown in FIG. 2 is advantageous in that the filters 60 can be placed within jumpers at the customer's premises. In this case, no additional space allocation for hardware need be provided.

Figure 4:
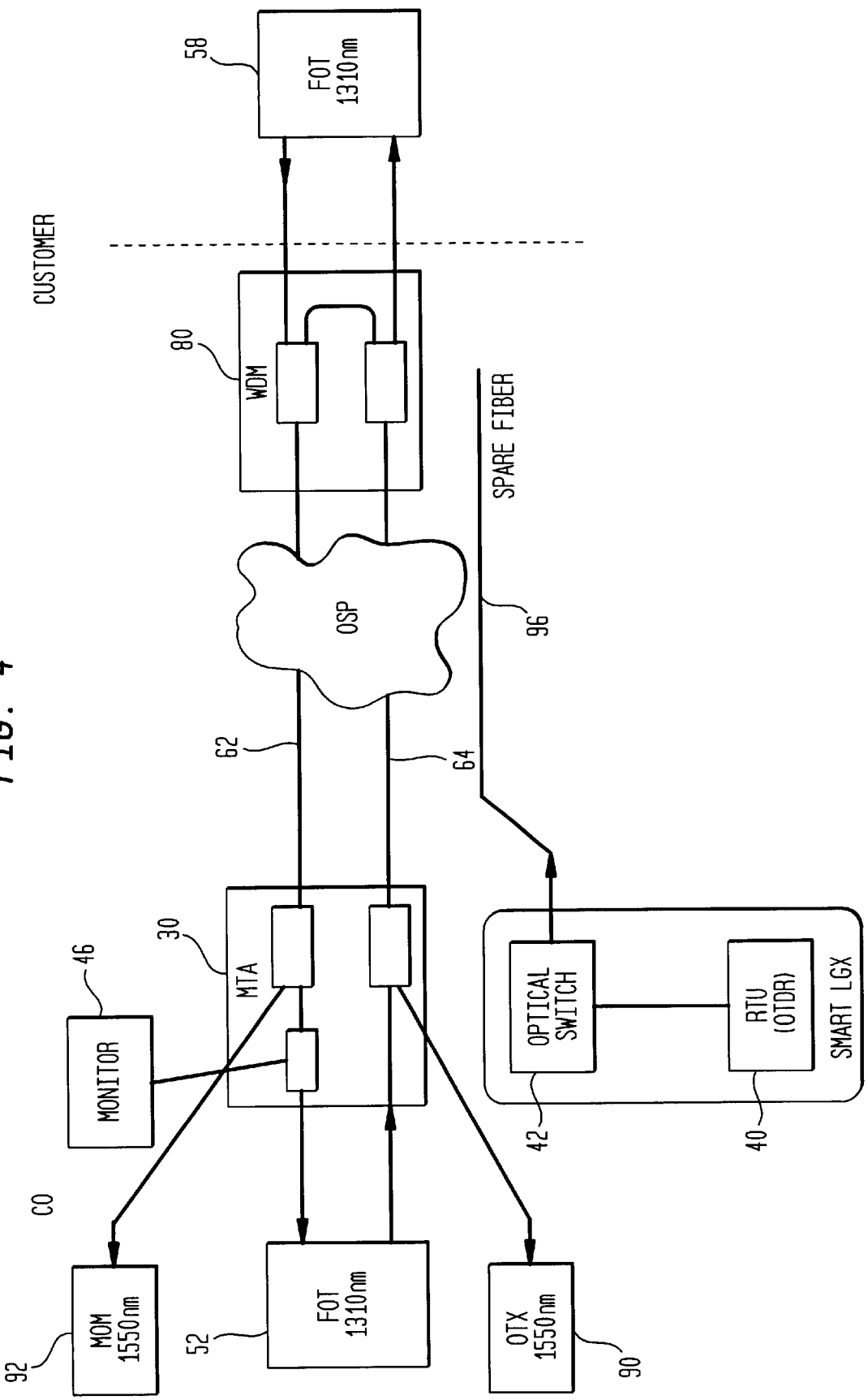
FIG. 4 is a schematic view of a third embodiment of the present invention system, illustrating its method of operation.

In another embodiment of the present invention shown in FIG. 4, the MFA module 30 couples to an optical transmitter (OTX) module 90 and monitor only (MOM) module 92 which generates and receive a round trip test signal on a specified fiber optic cable pair. The OTX module 90 contains, for example, a 1550 nm stabilized laser light source that is used to generate the optical test signal. The MOM module 92 contains power monitoring electronics that are used to continuously monitor the power level of the OTX signal. The OTX and the MOM module can be found as components of a Loop Back Monitoring System for fiber optic cables which is manufactured by Lucent Technologies. The operation and makeup of the OTX and MOM module are described in U.S. Patent Application Ser. No. 09/430, 548, entitled, OPTICAL TRANSMITTER MODULE FOR A FIBER OPTIC LOOP BACK MONITORING SYSTEM, (Jennings 9-16-36) filed Oct. 29, 1999 and U.S. patent aqpplication Ser. No. 09/430,640, entitled, MONITOR MODULE FOR A FIBER OPTIC LOOP BACK MONITORING SYSTEM, (Jennings 10-17-37) filed Oct. 29, 1999, respectively.

As with the embodiment described in FIG. 3, the MTA module 30 monitors the transmission signal generated from the fiber optic transmission equipment 58 at the customer location to determine the condition of the fiber optic link. The entire fiber path is also monitored by way of a test signal which is generated from the OTX module on the central office transmit fiber 64 and then looped back using the WDM module 80 onto the receive fiber 62. The test signal is then received and processed using the electronics in the MOM module 92. As can be seen, there is no automated OTDR test access using the methodology described in FIG. 4. However, OTDR testing can still be accomplished utilizing spare or dark fibers 96. Since many service disruptions are the result of breaks or severe bends to an entire fiber optic cable, dark fiber testing provides reasonable accuracy for pinpointing the location of a service disruption It will be understood that the embodiments of the present invention system and method specifically shown and described is merely exemplary and that a person skilled in the art can make alternate embodiments using different configurations and functionally equivalent components. For instance, although the present invention is described as part of an automated fiber administration system, it would be understood that the components thereof can function equally well as part of a stand alone system. All such alternate embodiments are intended to be included in the scope of this invention as set forth in the following claims.

What is claim is:

1. In a telecommunications system where two dedicated optical fiber extend from a central office of a telecommunications provider to a customer facility through an optical fiber network, a method of remotely testing the two optical fibers, comprising the steps of:

providing a first and second wave division multiplexer at said central office, each wave division multiplexer coupling to one of said two dedicated optical fibers prior to entering a fiber optic transmission system at said central office, wherein said second wave division multiplexer couples to an optical test port;

providing an optical tap at said central office between said first wave division multiplexer and said fiber optic transmission system for tapping off a portion of a transmission signal received from said customer facility;

electronically monitoring said transmission signal received by said optical tap, wherein a trouble signal is indicated when said transmission signal falls below a given threshold;

introducing an optical test signal into a first of the two dedicated optical fibers at the central office of the telecommunications provider;

looping said optical test signal from the first of the two dedicated optical fibers to a second of the two dedicated optical fibers at the customer facility; and monitoring said optical test signal in the second of the two dedicated optical fibers at the central office.

2. The method of claim 1, wherein a third and fourth wave division multiplexer are coupled to each of said two dedicated optical fibers at said customer facility to prevent said test signal from entering fiber optic transmission equipment at said customer facility, one end said third and fourth wave division multiplexer being optically coupled to one another to accomplish loop back of said optical test signal.

3. The method of claim 2, wherein said third and fourth wave division multiplexer are included in a single module.

4. The method of claim 1 wherein said optical test signal is an OTDR test signal.

5. The method of claim 1 wherein said test signal is generated from an optical test signal source for producing an optical test signal and said optical test signal is received by an optical signal monitor for detecting said optical test signal.

6. The method of claim 5, wherein OTDR test signals are launched over spare fibers.

7. The method of claim 1, wherein monitoring of said optical test signal and said transmission signal received from said customer facility is accomplished in a fiber administration system.

8. In a telecommunications system where two dedicated optical fibers extend from a central office of a telecommunications provider to a customer facility through an optical fiber network, a system for remotely testing the two optical fibers, the system comprising:

a first and second wave division multiplexer at said central office, each wave division multiplexer coupling to one of said two dedicated optical fibers prior to entering a fiber optic transmission system at said central office, wherein said second wave division multiplexer couple to an optical test port;

an optical tap at said central office between said first wave division multiplexer and said fiber optic transmission system for tapping of a portion of transmission signal received from said customer facility;

an optical monitoring circuit for electronically monitoring said transmission signal received by said optical tap, wherein a trouble signal is indicated when said transmission signal received given threshold;

means for introducing an optical test signal into a first of the two dedicated koptecal fibers at the central office of the telecommunications provider, wherein said optical test signal from the first of the two dedicated optical fibers is looped to a second of the two ededicated optical fibers at the customer facility; and means for monitoring said optical test signal on the second of the two dedicated optical fibers at the central office.

9. The system of claim 8, wherein a third and fourth wave division multiplexer are coupled to each of said two dedicated optical fibers at said customer facility to prevent said test signal from entering fiber optic transmission equipment at said customer facility, one end of said third and fourth wave division multiplexer being optically coupled to one another to accomplish loop back of said optical test signal.

10. The system of claim 8, wherein said optical test signal is an OTDR test signal.

11. The system of claim 8, further including an optical test signal source for producing said optical test signal and an optical signal monitor for detecting said optical test signal.

12. The system of claim 11, wherein a monitor and test access module, said test signal source and said optical signal monitor are separate modules contained within a shelf of a fiber administration system at the central of the telecommunication provider.

* * * * *